United States Patent [19]

Chen

[11] Patent Number: 5,916,332
[45] Date of Patent: Jun. 29, 1999

[54] PEDAL ASSEMBLY OF A BICYCLE

[76] Inventor: Chung-I Chen, No. 3, King-Chi Rd., Yu-Shih Industrial Dist., Ta-Chia Chen, Taichung Hsien, Taiwan

[21] Appl. No.: 08/918,789

[22] Filed: Aug. 25, 1997

[51] Int. Cl.$^6$ .................................................. G05G 1/14
[52] U.S. Cl. ........................................ 74/594.6; 74/594.4
[58] Field of Search ................................ 74/594.4, 594.6

[56] References Cited

U.S. PATENT DOCUMENTS

| | | | |
|---|---|---|---|
| 5,203,229 | 4/1993 | Chen | 74/594.4 X |
| 5,259,270 | 11/1993 | Lin | 74/594.6 |
| 5,505,111 | 4/1996 | Nagano | 74/594.6 |
| 5,771,757 | 6/1998 | Hanamura | 74/594.6 X |
| 5,784,931 | 7/1998 | Ueda | 74/594.6 X |

FOREIGN PATENT DOCUMENTS

516013A2  12/1992  European Pat. Off. ............. 74/594.6

Primary Examiner—Khoi Q. Ta
Assistant Examiner—Ha Ho
Attorney, Agent, or Firm—Panitch Schwarze Jacobs & Nadel, P.C.

[57] ABSTRACT

A pedal assembly of a bicycle includes a pedal body, a pedal shaft and a foot cleat engaging unit. The pedal body includes a lateral cage portion and an inside frame portion which is connected detachably to the cage portion. The inside frame portion has a foot support face. The pedal shaft is journalled in the inside frame portion. The foot cleat engaging unit has a mounting frame connected detachably to the inside frame portion on the foot support face. The mounting frame carries a first foot cleat engaging member and a spring-loaded second foot cleat engaging member, thereby mounting removably the first and second foot cleat engaging members on the foot support face.

3 Claims, 7 Drawing Sheets

PEDAL ASSEMBLY OF A BICYCLE

BACKGROUND OF THE INVENTION

1. Field of the Invention

This invention relates to a pedal assembly of a bicycle, more particularly to a pedal assembly of a bicycle which has a cleat engaging unit that is adapted to be mounted detachably thereon.

2. Description of the Related Art

Referring to FIG. 1, a conventional pedal assembly for an ordinary bicycle is shown to include a generally rectangular cage portion 10 and a tubular frame portion 13. The tubular frame portion 13 is connected to the cage portion 10 and divides the cage portion 10 into a front portion 11 and a rear portion 12 that are located on two sides of the tubular frame portion 13. A pedal shaft 14 is journalled in the tubular frame portion 13.

Referring to FIGS. 2 and 3, another conventional pedal assembly for a competition bicycle is shown to include a pedal body 20, a pedal shaft 24 and a foot cleat engaging unit 30. The pedal body 20 includes a U-shaped cage portion 21 and a generally H-shaped inside frame portion 25 which has two arm sections 22 and an intermediate connecting section 23. The pedal shaft 24 is journalled in the intermediate connecting section 23 of the inside frame portion 25. The foot cleat engaging unit 30 has a mounting frame 33 formed integrally and transversely with the intermediate connecting section 23, a first foot cleat engaging member 31 and a spring-loaded second foot cleat engaging member 32. The first foot cleat engaging member 31 is secured to the mounting seat 33 by means of screw fasteners 34. The second foot cleat engaging member 32 is secured to the arm sections 31. The first and second foot cleat engaging members 31, 32 cooperate with each other in order to engage a cleat (not shown) which is fixed to a cyclist's shoe, thereby preventing the cyclist's shoe from disengaging the pedal assembly. However, the conventional pedal assembly of the competition bicycle is not usable as the aforementioned pedal assembly of the ordinary bicycle, thereby limiting the range of use thereof.

SUMMARY OF THE INVENTION

The object of the present invention is to provide a pedal assembly which is usable as either a normal or competition-type pedal in order to increase the range of use thereof.

According to the present invention, a pedal assembly of a bicycle comprises a pedal body, a pedal shaft and a foot cleat engaging unit. The pedal body includes a lateral cage portion and an inside frame portion which is connected detachably to the cage portion. The inside frame portion has a foot support face. The pedal shaft is journalled in the inside frame portion. The foot cleat engaging unit has a mounting frame connected detachably to the inside frame portion on the foot support face. The mounting frame carries a first foot cleat engaging member and a spring-loaded second foot cleat engaging member, thereby mounting removably the first and second foot cleat engaging members on the foot support face.

BRIEF DESCRIPTION OF THE DRAWINGS

Other features and advantages of this invention will become apparent in the following detailed description of a preferred embodiment of this invention with reference to the accompanying drawings, in which.

DETAILED DESCRIPTION OF THE PREFERRED EMBODIMENT

Figure 1:
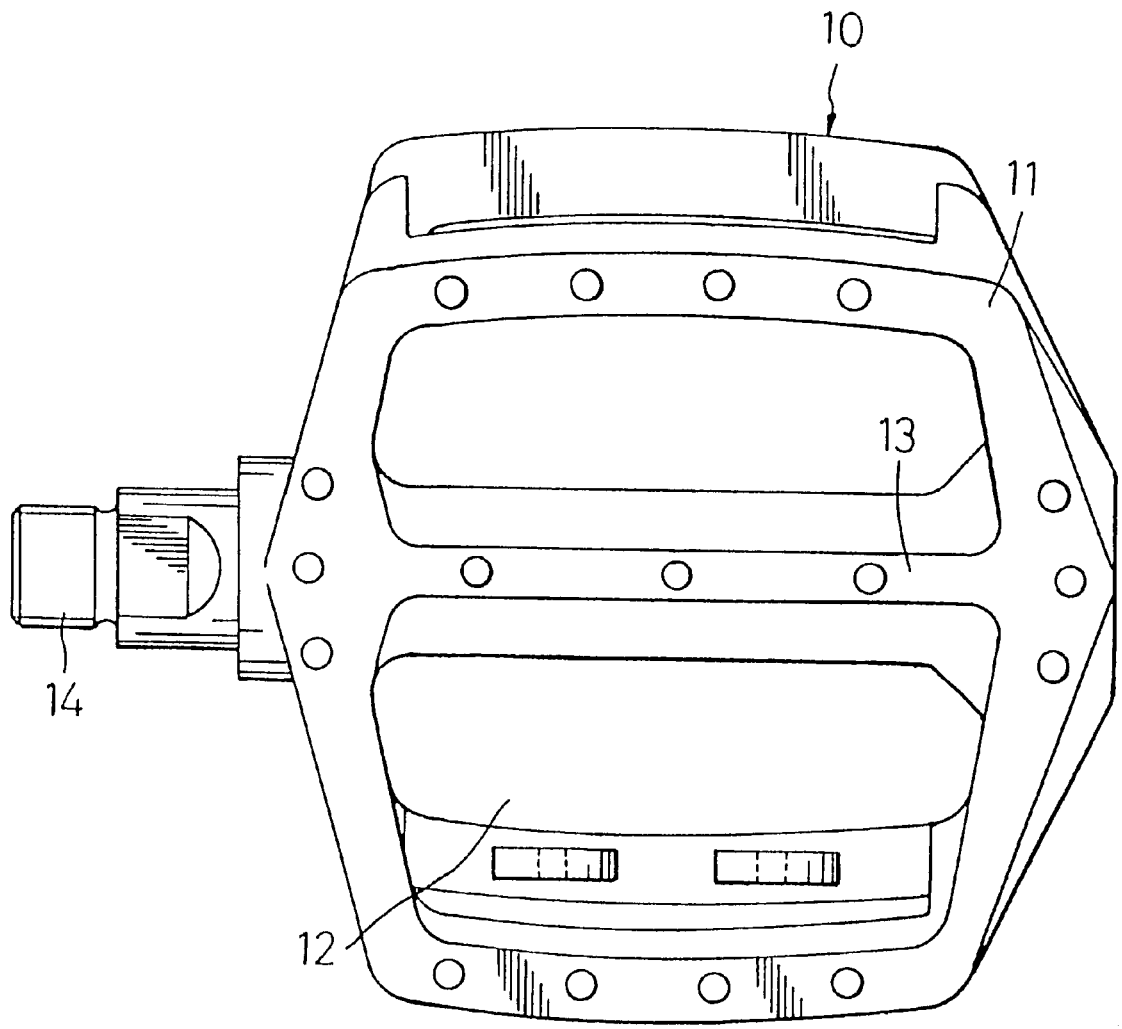
FIG. 1 is a top view of a conventional pedal assembly for an ordinary bicycle.
Figure 2:
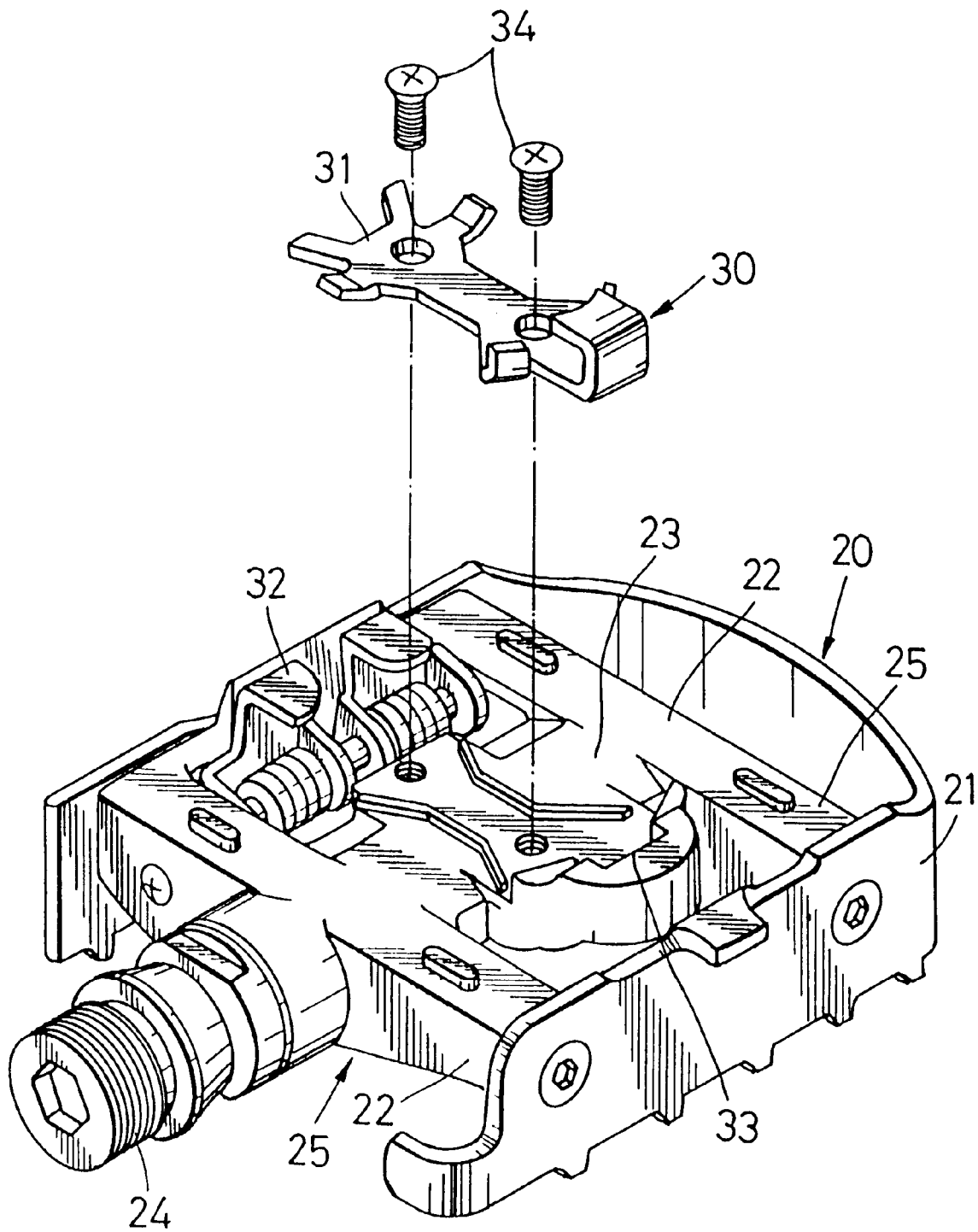
FIG. 2 is a partially exploded view of another conventional pedal assembly for a competition bicycle.
Figure 3:
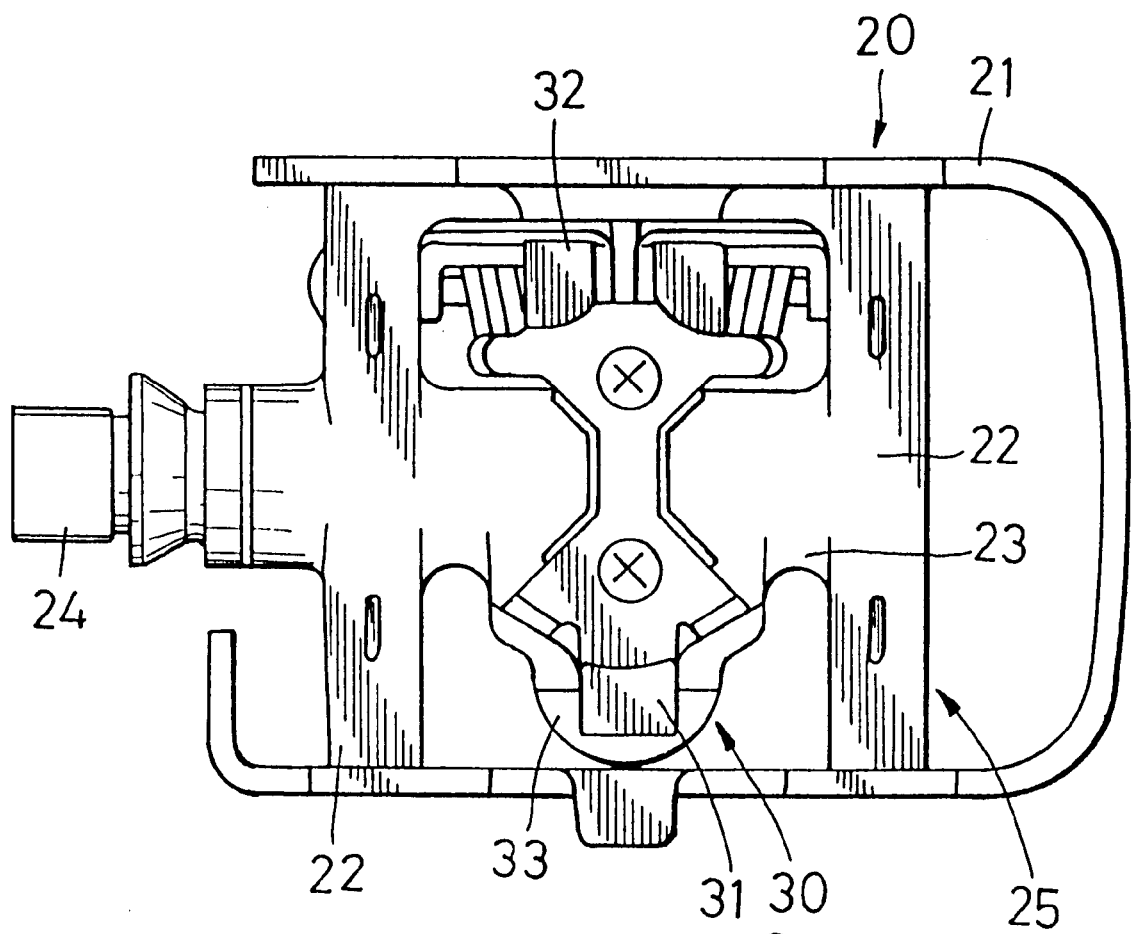
FIG. 3 is a top view of the conventional pedal assembly shown in FIG. 2.
Figure 4:
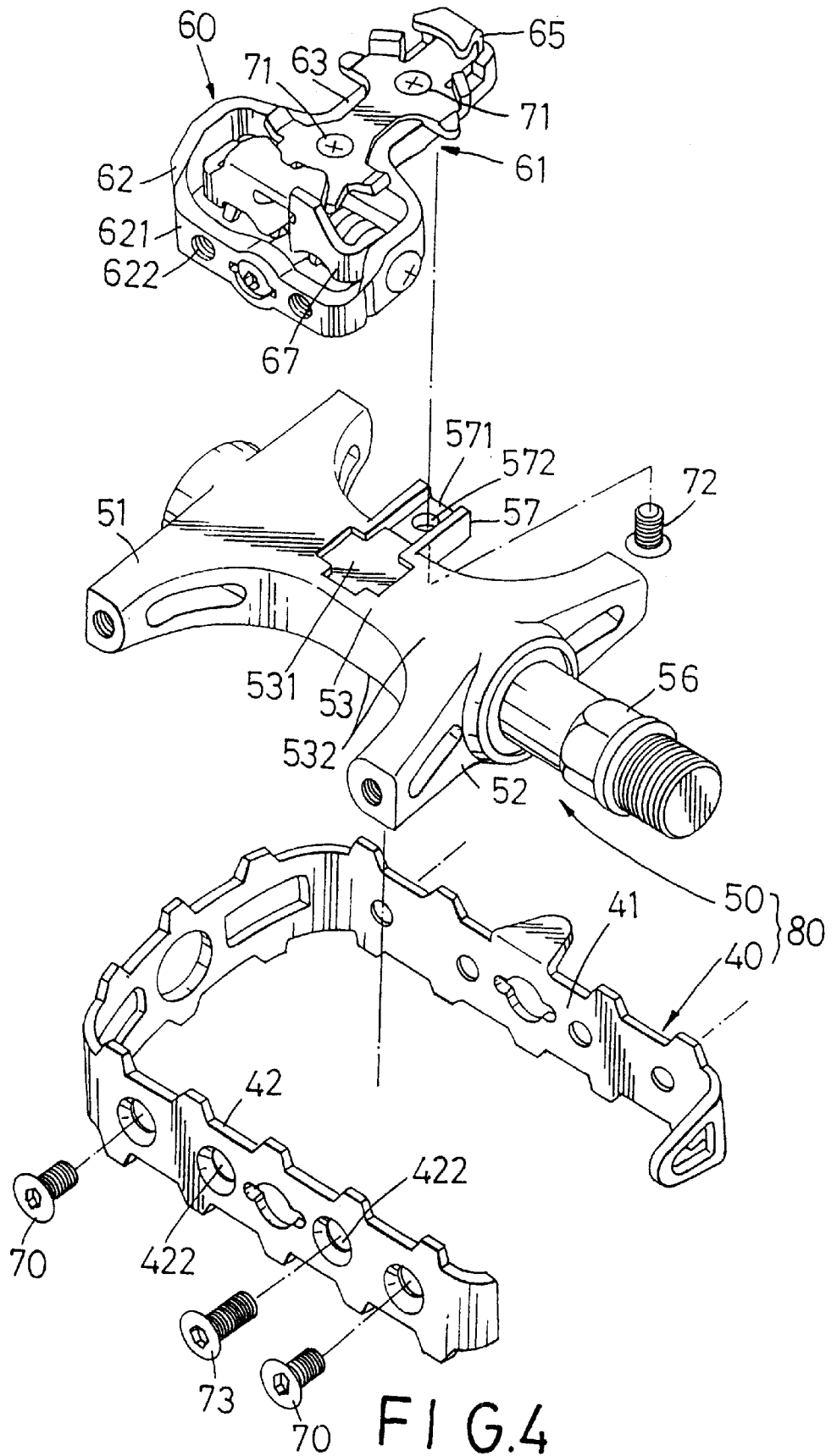
FIG. 4 is a partially exploded view of a preferred embodiment of a pedal assembly of a bicycle according to the present invention.

Referring to FIG. 4, a preferred embodiment of a pedal assembly of a bicycle according to the present invention is shown to comprise a pedal body 80, a pedal shaft 56 and a foot cleat engaging unit 60.

Figure 5:
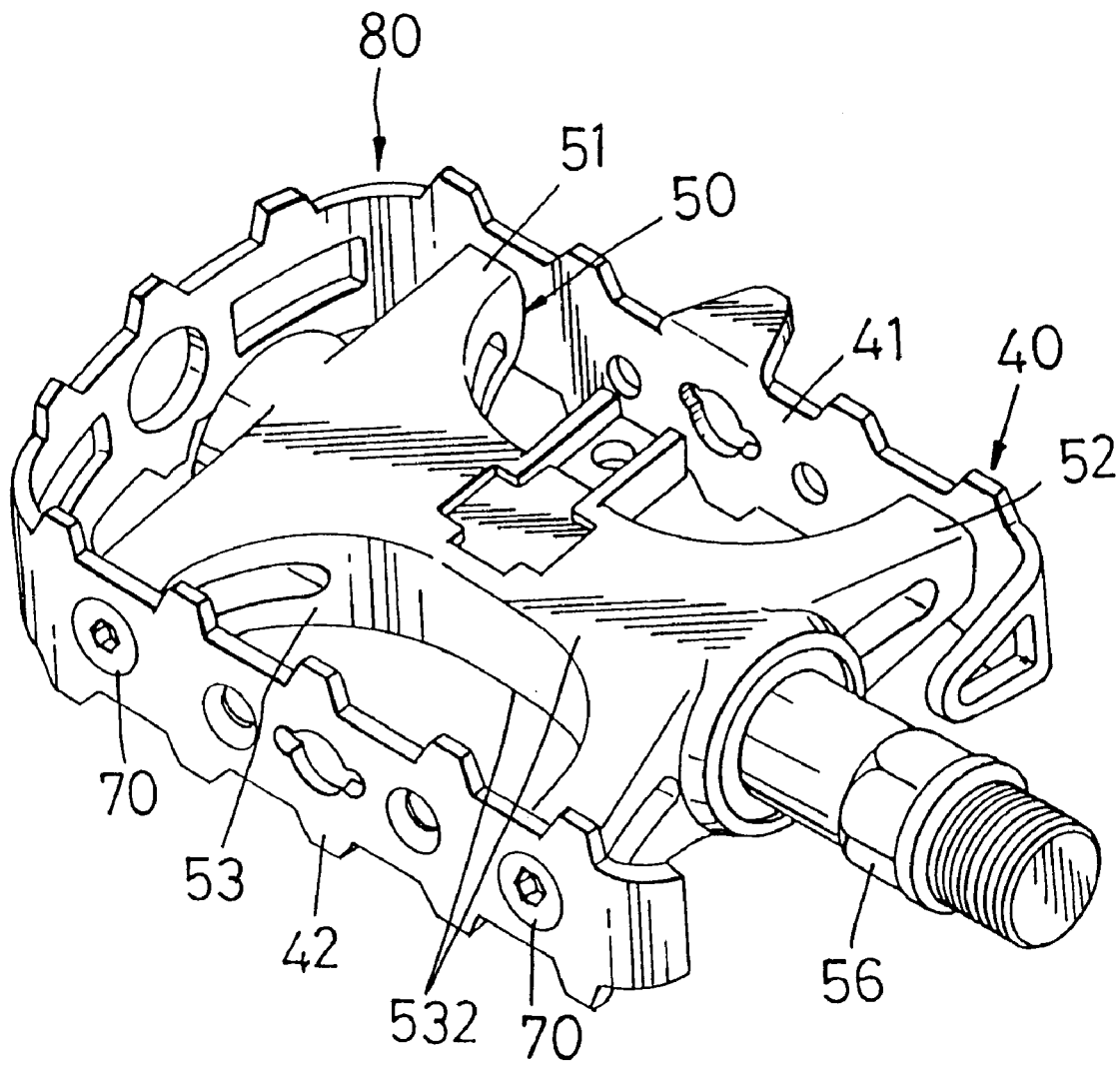
FIG. 5 is a perspective view of the preferred embodiment of a pedal assembly which is assembled for use as a normal-type pedal according to the present invention.

Referring to FIGS. 4 and 5, the pedal body 80 includes a generally U-shaped, lateral cage portion 40 and a generally H-shaped inside frame portion 50. The inside frame portion 50 has two arm sections 51, 52 which are connected detachably to two arm portions 41, 42 of the cage portion 40 by means of screw fasteners 70 in a known manner, and an intermediate connecting section 53. The pedal shaft 56 is journalled in intermediate connecting section 53 of the inside frame portion 50. The inside frame portion 50 further has two opposite generally planar faces 532 which are formed at two sides of the pedal shaft 56 to be substantially flush with the cage portion 40. At least one of the planar faces 532 serves as a foot support face.

Figure 6:
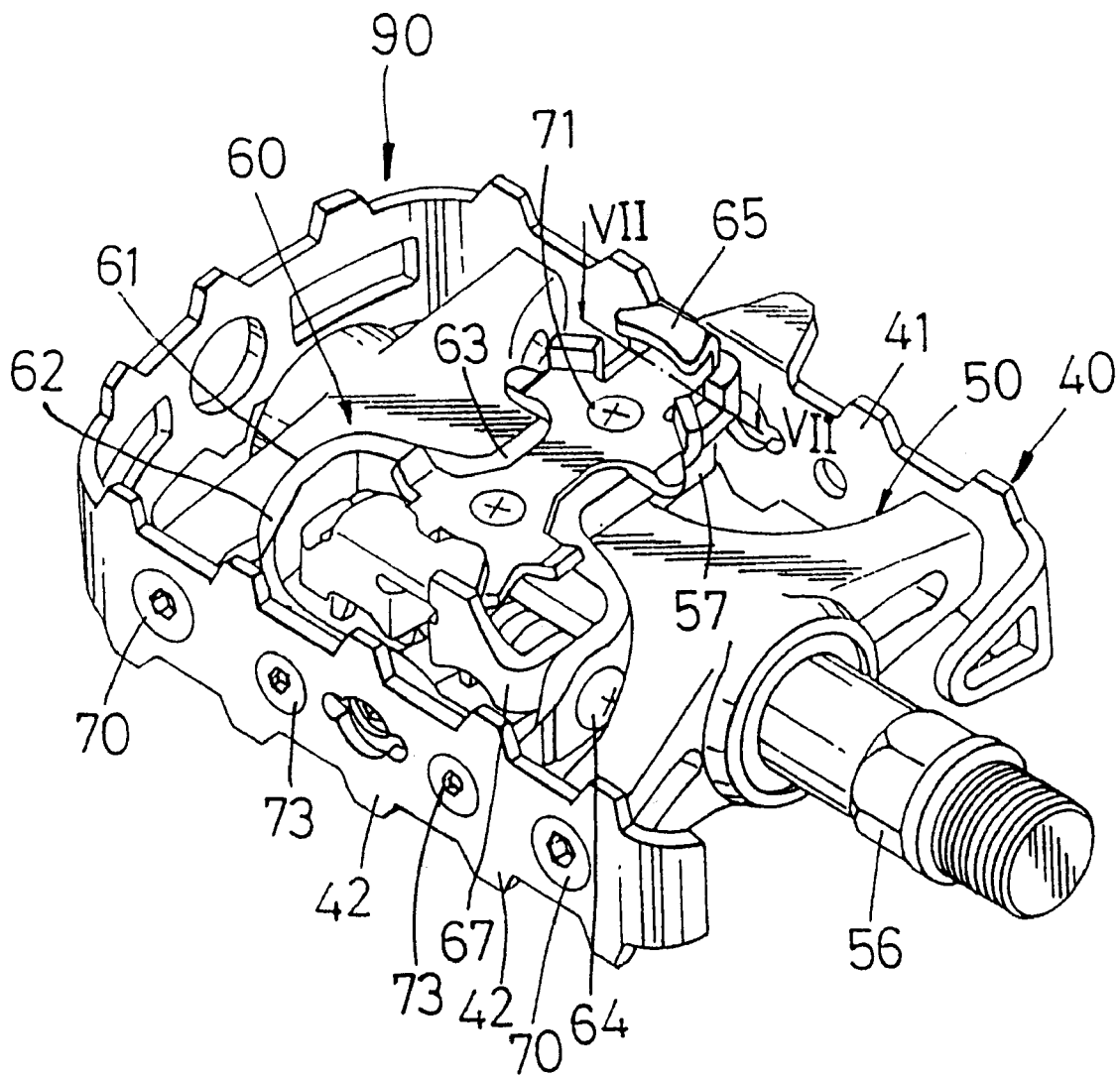
FIG. 6 is a perspective view of the preferred embodiment of a pedal assembly which is assembled for use as a competition-type pedal according to the present invention.

Referring to FIGS. 4 and 6, the foot cleat engaging unit 60 has a mounting frame 61 which is connected detachably to the inside frame portion 50 on the foot support face 532. The mounting frame 61 carries a first foot cleat engaging member 65 and a spring-loaded second foot cleat engaging member 67, thereby mounting removably the first and second foot cleat engaging members 65, 67 on the foot support face 532. The structures of the first and second foot cleat engaging members 65, 67 are similar to those of the cleat engaging members and the retaining units of the quick-release pedal which is disclosed in applicant's co-pending U.S. patent application Ser. No. 08/713,124, the entire disclosure of which is incorporated herein by reference.

Figure 7:
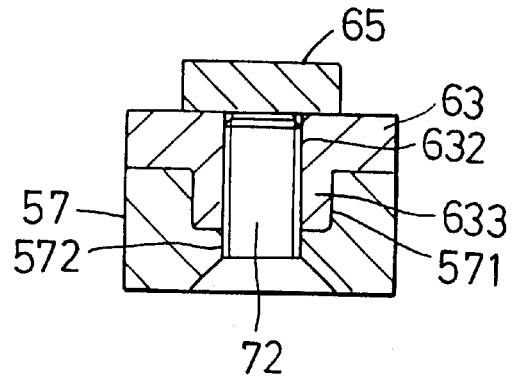
FIG. 7 is a cross sectional view taken along the line 7—7 in FIG. 6.
Figure 8:
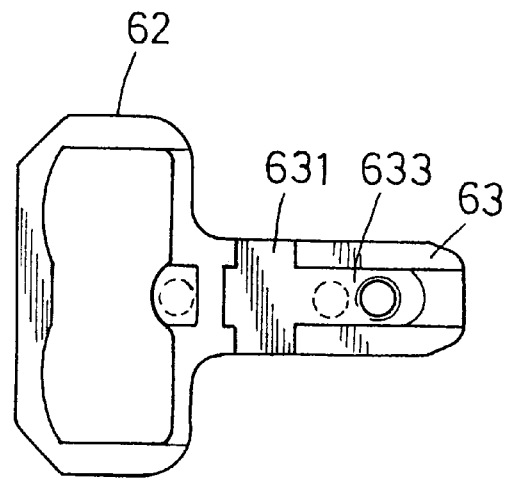
FIG. 8 is a schematic view illustrating the bottom face of the cleat engaging unit of the preferred embodiment according to the present invention.

The intermediate connecting section 53 includes a seat 57 projecting from one side thereof between the arm sections 51, 52. The inside frame 50 has a shallow recess 531 formed on the foot support face 532 adjacent to the seat 57. The seat 57 has a groove 571 communicated with the shallow recess 531 to cooperate therewith so as to receive a portion of the mounting frame 61. The mounting frame 61 has a loop member 62 positioned within the arm sections 51, 52 and a portion of the cage portion 40 at the other side of the intermediate connecting section 53. The second foot cleat engaging member 67 is mounted to the loop member 62. The mounting frame 61 further has an elongated member 63 extending from the loop member 62 to the seat 57. The first cleat engaging member 65 is connected to the elongated member 63 by means of screw fasteners 71. The elongated member 63 has a first projection 631 which is received in the shallow recess 531 and a second projection 633 which is received in the groove 571, as best illustrated in FIGS. 7 and 8. A screw fastener 72 passes through a through hole 572 which is formed in the seat 57 to engage threadedly in an aligned threaded hole 632 which is formed in a lower face of the elongated member 63 in order to secure the inside frame portion 50 to the mounting frame 61 of the foot cleat engaging unit 60. The loop member 62 of the mounting frame 61 has a generally straight section 621 with two threaded holes 622. The cage portion 40 has two holes 422 which are aligned with the threaded holes 622 of the loop member 62 when the mounting frame 61 is connected to the inside frame portion 50. Two screw fasteners 73 extend through the holes 422 in the cage portion 40 to engage threadedly the threaded holes 622 in the loop member 62. Therefore, the foot cleat engaging unit 60 can engage firmly the cage portion 40. Thus, the pedal assembly of this invention is usable as a competition-type pedal 90 when the foot cleat engaging unit 60 is secured to the pedal body 80, as shown in FIG. 6. The pedal assembly of this invention can also be used as a normal-type pedal assembly, as shown in FIG. 5, by removing the foot cleat engaging unit 60 from the pedal body 80. The objective of the present invention is thus met.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangement.

I claim:

1. A pedal assembly of a bicycle, comprising:

a pedal body including a U-shaped lateral cage portion and an inside frame portion surrounded by said cage portion, said inside frame portion having two opposing arm sections and an intermediate connecting section extending between said arm sections to form an H-shape, said inside frame portion having a foot support face, both of said arm sections having opposite ends connected to said cage portion, said cage portion having arm portions bridging said opposite ends of said arm sections, said arm portions, said intermediate connecting section and said arm sections having inner surfaces which define two hollow spaces at two sides of said intermediate connecting section;

a pedal shaft received in said intermediate connecting section; and a foot cleat engaging unit having a mounting frame connected detachably to said pedal body, said mounting frame carrying a first foot cleat engaging member and a spring-loaded second foot cleat engaging member, the mounting frame being removably mounted on said pedal body;

said mounting frame having a loop member received entirely within one of said hollow spaces and having a straight section extending continuously along said inner surfaces of one of said arm portions of said cage portion and said arm sections and being retained within said inner surfaces;

said mounting frame further having an elongated member projecting into the other of said hollow spaces from said loop member by passing over said intermediate connecting section, said elongated member being connected to said first foot cleat engaging member;

said intermediate connecting section having a seat projecting into the other of said hollow spaces, said seat having a groove for receiving and engaging said elongated member; and said straight section having at least one hole opposite to said one of said arm portions of said cage portion, and at least one screw fastener passing through said hole to fasten said straight section to said cage portion.

2. The pedal assembly as claimed in claim 1, wherein said cage portion is connected detachably to said opposite of said arm sections of said inside frame portion.

3. The pedal assembly as claimed in claim 1, wherein said cage portion is flush with said foot support face of said inside frame portion.

\* \* \* \* \*